United States Patent
Joyner et al.

(10) Patent No.: US 6,907,667 B2
(45) Date of Patent: Jun. 21, 2005

(54) METHOD FOR FACILITATING THE ASSEMBLY OF A UNIVERSAL JOINT

(75) Inventors: Robert G. Joyner, Toledo, OH (US); James L. Oess, Toledo, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 138 days.

(21) Appl. No.: 10/270,088

(22) Filed: Oct. 14, 2002

(65) Prior Publication Data

US 2003/0110634 A1 Jun. 19, 2003

Related U.S. Application Data

(60) Provisional application No. 60/328,745, filed on Oct. 12, 2001.

(51) Int. Cl.⁷ .............................................. B21D 53/10
(52) U.S. Cl. .............................. 29/898.07; 29/898.08; 29/281.1; 29/467
(58) Field of Search ........................ 29/898.08, 898.07, 29/898.09, 464, 467, 559, 271, 281.1, 281.5, 251

(56) References Cited

U.S. PATENT DOCUMENTS

| | | | |
|---|---|---|---|
| 3,039,183 A | | 6/1962 | Laster |
| 3,230,617 A | | 1/1966 | Spiess et al. |
| 3,237,291 A | * | 3/1966 | Kelso ........................ 29/257 |
| 3,290,754 A | | 12/1966 | Pitner |
| 3,517,433 A | * | 6/1970 | Pitner ........................ 29/434 |
| 3,529,942 A | | 9/1970 | Pitner |
| 3,722,066 A | | 3/1973 | Spiess |
| 3,786,544 A | | 1/1974 | Ferguson |
| 4,162,568 A | * | 7/1979 | Spiess ........................ 29/281.3 |
| 4,558,502 A | * | 12/1985 | Gossmann et al. ........... 29/434 |
| 4,704,782 A | * | 11/1987 | Spiess et al. ................ 29/434 |
| 4,977,660 A | * | 12/1990 | Maynard ..................... 29/251 |
| 5,715,600 A | * | 2/1998 | Marriott et al. .......... 29/898.07 |
| 5,836,078 A | * | 11/1998 | Aiken et al. ............ 29/898.07 |
| 5,857,252 A | * | 1/1999 | Jansen ........................ 29/257 |
| 6,035,533 A | | 3/2000 | Warnke et al. |
| 6,855,060 B2 | * | 2/2005 | Breese et al. ............... 464/130 |

FOREIGN PATENT DOCUMENTS

JP          110264422          9/1999

* cited by examiner

*Primary Examiner*—Essama Omgba
(74) *Attorney, Agent, or Firm*—MacMillan, Sobanski & Todd, LLC

(57) ABSTRACT

A method of assembling components of a universal joint, such as a cross and a yoke, positions and maintains the rotational center axes thereof in co-axial alignment during the assembly process. The universal joint includes a yoke including a body portion and first and second arms, wherein the first and second arms have respective openings formed therethrough. The universal joint also includes a cross including a body portion having a plurality of trunnions extending outwardly therefrom. Initially, an assembly tool having a recess formed therein is supported on the yoke such that the recess is precisely positioned relative to the rotational center axis of the yoke. Then, the cross is supported on the assembly tool such that one of the trunnions is received within and supported by the recess formed in the assembly tool. As a result, the rotational center axis of the cross is co-axially aligned with the rotational center axis of the yoke. Lastly, bearing cups are installed within the openings and respectively about the trunnions of the cross to complete the assembly.

21 Claims, 7 Drawing Sheets

METHOD FOR FACILITATING THE ASSEMBLY OF A UNIVERSAL JOINT

CROSS REFERENCE TO RELATED APPLICATION

This application claims the benefit of U.S. Provisional Application No. 60/328,745, filed Oct. 12, 2001.

BACKGROUND OF THE INVENTION

This invention relates in general to universal joints for providing a driving connection between two members that are adapted to rotate about non-aligned axes of rotation. In particular, this invention relates to a method and an apparatus for facilitating the assembly of the components that make up such a universal joint.

Universal joints are well known devices that provide a driving connection between two members that are adapted to rotate about non-aligned axes of rotation. A typical universal joint includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement therebetween. The bearing cups mounted on a first opposed pair of the trunnions are connected to a first yoke secured to an end of a first member, while the bearing cups mounted on a second opposed pair of the trunnions are connected to a second yoke secured to an end of a second member.

A full round end yoke is one type of yoke that is commonly used in a universal joint. A typical full round end yoke includes a body portion having a pair of opposed yoke arms extending therefrom. Each of the opposed yoke arms has a cylindrical opening formed in the end thereof. The two openings are co-axially aligned with one another, each extending between an outer surface and an inner surface of the associated yoke arm. To assemble the universal joint, two of the opposed trunnions of the universal joint cross (having no bearing cups mounted thereon) are initially inserted within the two openings formed through the yoke arms. Then, the bearing cups are moved axially inwardly through the openings from the outer surfaces of the yoke arms toward the inner surfaces thereof. In this manner, the bearing cups are installed over the ends of the opposed trunnions within the openings formed through the yoke arms. A pair of retainer clips or other retaining structures may then be secured to the full round end yoke to retain the bearing cups within the two openings formed through the yoke arms and on the associated trunnions.

During the assembly of the various components that make up the universal joint, it is important that the rotational center axis of the cross be precisely co-axially aligned with the rotational center axis of the yoke. If this co-axial alignment is not maintained, then undesirable rotational imbalances may be created within the universal joint. Such rotational imbalances can, if not corrected, result in the generation of undesirable noise and vibration when the universal joint is rotated during use. The correction of such imbalances usually involves the securement of one or more balance weights to the yoke, some other portion of the universal joint, or the driveshaft itself, which can result in undesirable additional time and expense during the assembly process. Thus, it would be desirable to provide an apparatus and method for facilitating the assembly of the components of a universal joint in such a manner that positions and maintains the rotational center axis of the cross co-axially aligned with the rotational center axis of the yoke during the assembly process.

SUMMARY OF THE INVENTION

This invention relates to a method and an apparatus for assembling components of a universal joint, such as a cross and a yoke, such that the rotational center axes thereof are co-axially aligned during the assembly process. The universal joint includes a yoke including a body portion and first and second arms, wherein the first and second arms have respective openings formed therethrough. The universal joint also includes a cross including a body portion having a plurality of trunnions extending outwardly therefrom. Initially, an assembly tool having a recess formed therein is supported on the yoke such that the recess is precisely positioned relative to the rotational center axis of the yoke. Then, the cross is supported on the assembly tool such that one of the trunnions is received within and supported by the recess formed in the assembly tool. As a result, the rotational center axis of the cross is co-axially aligned with the rotational center axis of the yoke. Lastly, bearing cups are installed within the openings and respectively about the trunnions of the cross to complete the assembly.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
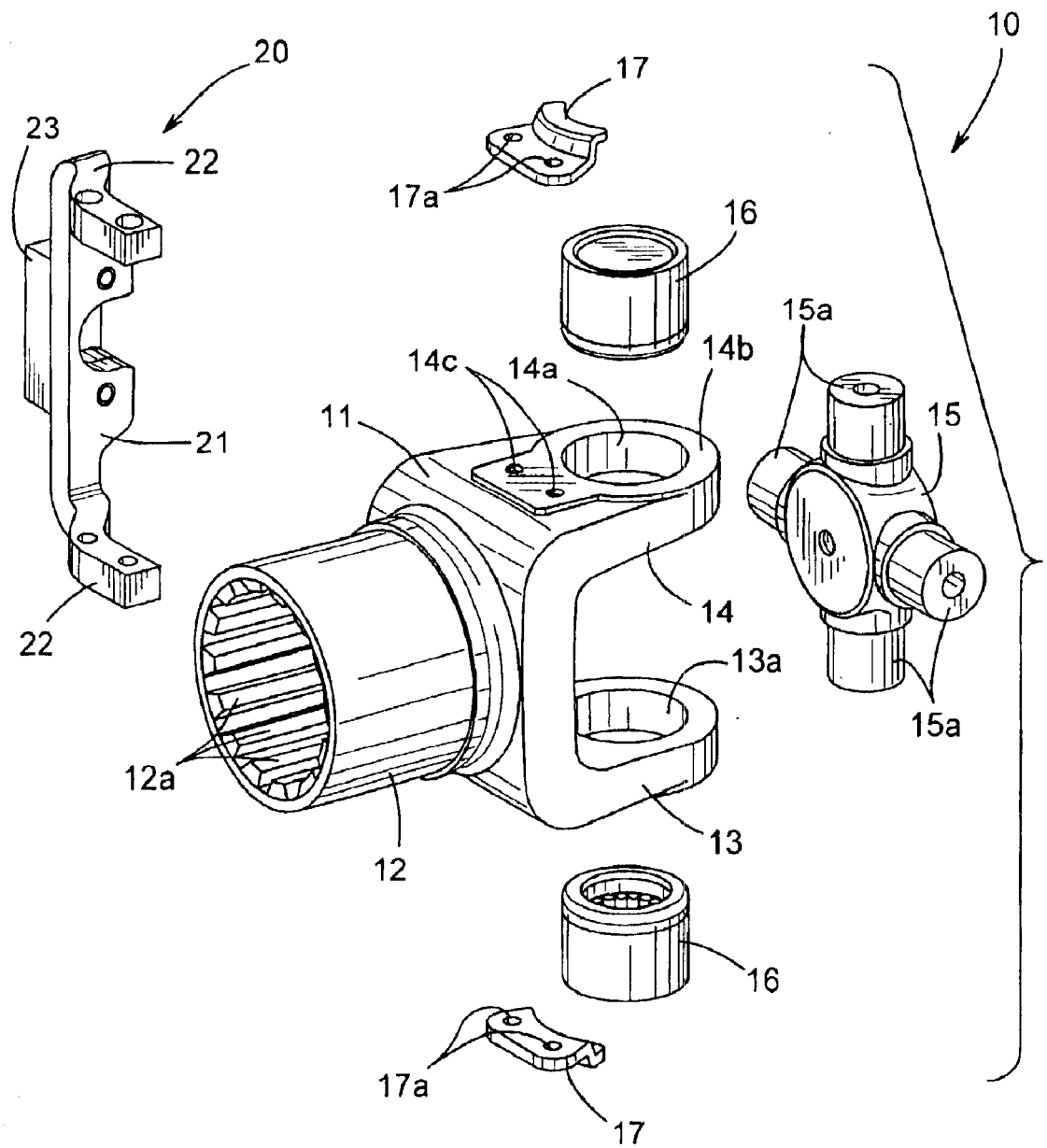
FIG. 1 is an exploded perspective view of a plurality of components of a portion of a conventional universal joint and a first embodiment of a tool in accordance with this invention for facilitating the assembly of such components.

Referring now to the drawings, there is illustrated in FIG. 1 a plurality of components, indicated generally at 10, that can be assembled to form a portion of a conventional universal joint. The components 10 of the illustrated portion of the universal joint include a yoke 11 including a sleeve portion 12 having a pair of opposed arms 13 and 14 extending therefrom. The sleeve portion 12 is generally hollow and cylindrical in shape and has a plurality of spines 12a formed on an inner surface thereof to facilitate a rotational driving engagement with a driveshaft (not shown)

or other member. The arms 13 and 14 of the yoke 11 have respective openings 13a and 14a formed therethrough that are co-axially aligned with one another. The arms 13 and 14 of the yoke 11 also have respective outer surfaces 13b and 14b formed about each of the openings 13a and 14a. As is well known, the outer surfaces 13b and 14b are formed (typically by machining) on the arms 13 and 14 of the yoke ii in such a manner as to provide surfaces that are precisely positioned relative to the rotational center axis of the yoke 11. Thus, the machined outer surfaces 13b and 14b are precisely spaced apart from one another by a predetermined distance on either side of the rotational center axis of the yoke 11. A pair of threaded bores, such as shown at 14c in FIG. 1, are formed through each of the machined outer surfaces 13b and 14b into each of the arms 13 and 14. The purposes for the aligned openings 13a and 14a, the machined outer surfaces 13b and 14b, and the threaded bores 14c will be explained below.

The components 10 of the illustrated portion of the universal joint also include a cross 15 that includes a central body portion and having four generally cylindrical trunnions 15a extending outwardly therefrom. As is well known, the trunnions 15a extend radially outwardly from the body portion in a common plane and at right angles relative to one another. Two of the trunnions 15a are adapted to be received within the openings 13a and 14a of the arms 13 and 14 of the yoke 11 in the manner described below. The components 10 of the illustrated portion of the universal joint further include a pair of bearing cups 16 that are each generally hollow and cylindrical in shape, having one closed end and one opened end. The bearing cups 16 are adapted to be within the openings 13a and 14a formed through the arms 13 and 14 of the yoke 11 and about the trunnions 15a extending therein in the manner described below. Lastly, the components 10 of the illustrated portion of the universal joint include a pair of retainer clips 17 having respective apertures 17a formed therethrough. The retainer clips 17 are adapted to retain the bearing cups 16 within the openings 13a and 14a formed through the arms 13 and 14 of the yoke 11 in the manner described below. The various components 10 of the illustrated portion of the universal joint thus far described are all conventional and are intended to be representative of any of a variety of such components that can be assembled to form a universal joint that can be used to provide a driving connection between two members that are adapted to rotate about non-aligned axes of rotation.

Figure 2:
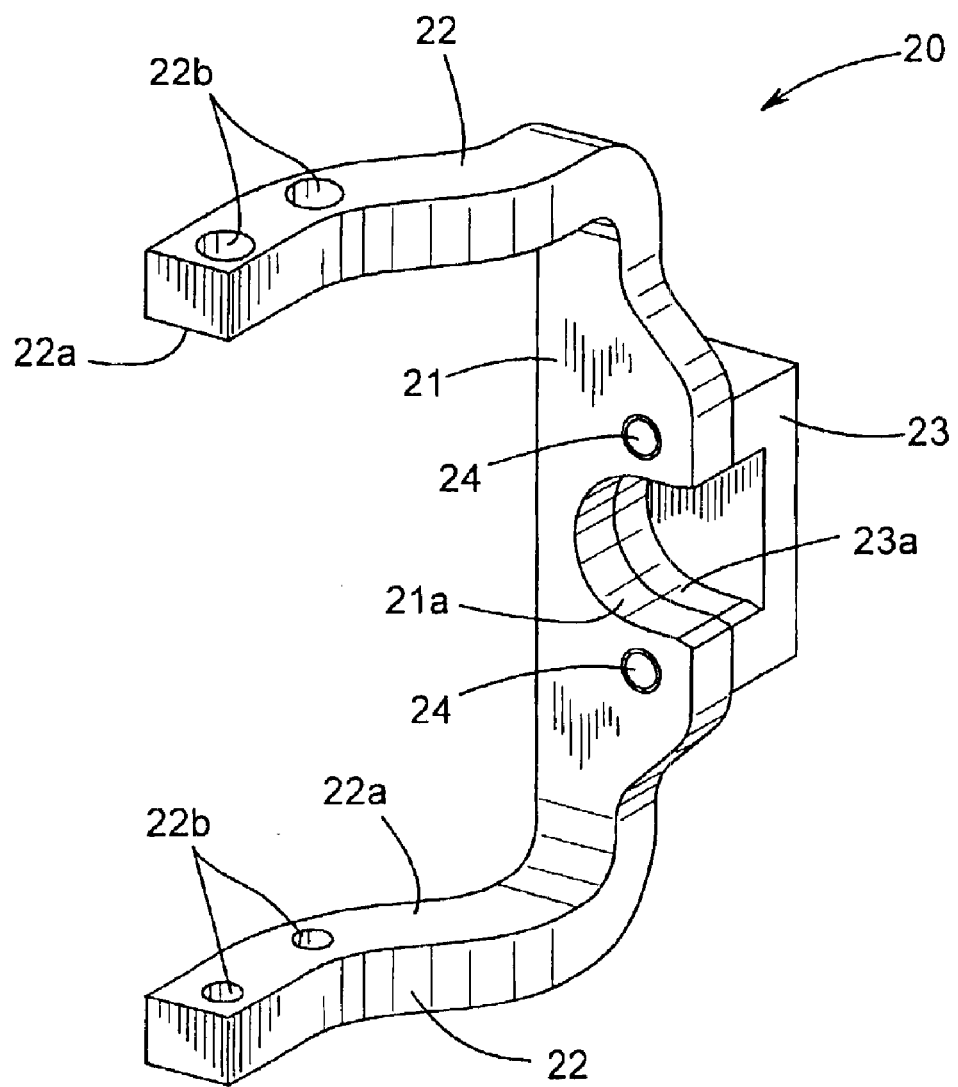
FIG. 2 is an enlarged perspective view of the first embodiment of the assembly tool illustrated in FIG. 1.

A first embodiment of a tool, indicated generally at 20, is provided to facilitate the assembly of the components 10 of the illustrated portion of the universal joint. As best shown in FIG. 2, the first embodiment of the assembly tool 20 is generally U-shaped, including a central body portion 21 having a pair of end portions 22 extending laterally therefrom. The central body portion 21 has a recess 21a formed therein. In the illustrated embodiment, the recess 21a is generally semi-cylindrical in shape. However, the recess 21a may have any desired shape (including a circular counterbore, for example) and may be embodied as any surface on the first embodiment of the assembly tool 20 that is capable of engaging or supporting the cross 15 thereon in a predetermined position relative to the yoke 11. The purpose for this recess 21a will be explained below. Preferably, the central body portion 21 has a length that is approximately the same as the precise predetermined distance between the machined outer surfaces 13b and 14b formed on the arms 13 and 14 of the yoke 11, as discussed above. Thus, the end portions 22 of the first embodiment of the assembly tool 20 have respective inner surfaces 22a that are also spaced apart from one another by approximately the same precise predetermined distance. A pair of apertures 22b are formed through each of the end portions 22 of the first embodiment of the assembly tool 20. As will be explained in greater detail below, the apertures 22b are positioned to be aligned with the threaded bores 14c formed in the machined outer surfaces 13b and 14b and into the arms 13 and 14 of the yoke 11.

If desired, an extension member 23 can be provided on the central body portion 21 of the first embodiment of the assembly tool 20. In the illustrated embodiment, the extension member 23 is formed from a separate piece of material that is secured to the central body portion 21 of the first embodiment of the assembly tool 20 by a pair of threaded fasteners 24. However, the extension member 23 can be secured to the central body portion 21 by any conventional means, and can, if desired, be formed integrally from a single piece of material with the central body portion 21. The extension member 23 has a recess 23a formed therein. In the illustrated embodiment, the recess 23a is generally semi-cylindrical in shape and is co-axially aligned with the recess 21a formed in the central body member 21, although such is not required. The extension member 23 is provided to increase the overall strength of the first embodiment of the assembly tool 20, as will be explained below.

Figure 3:
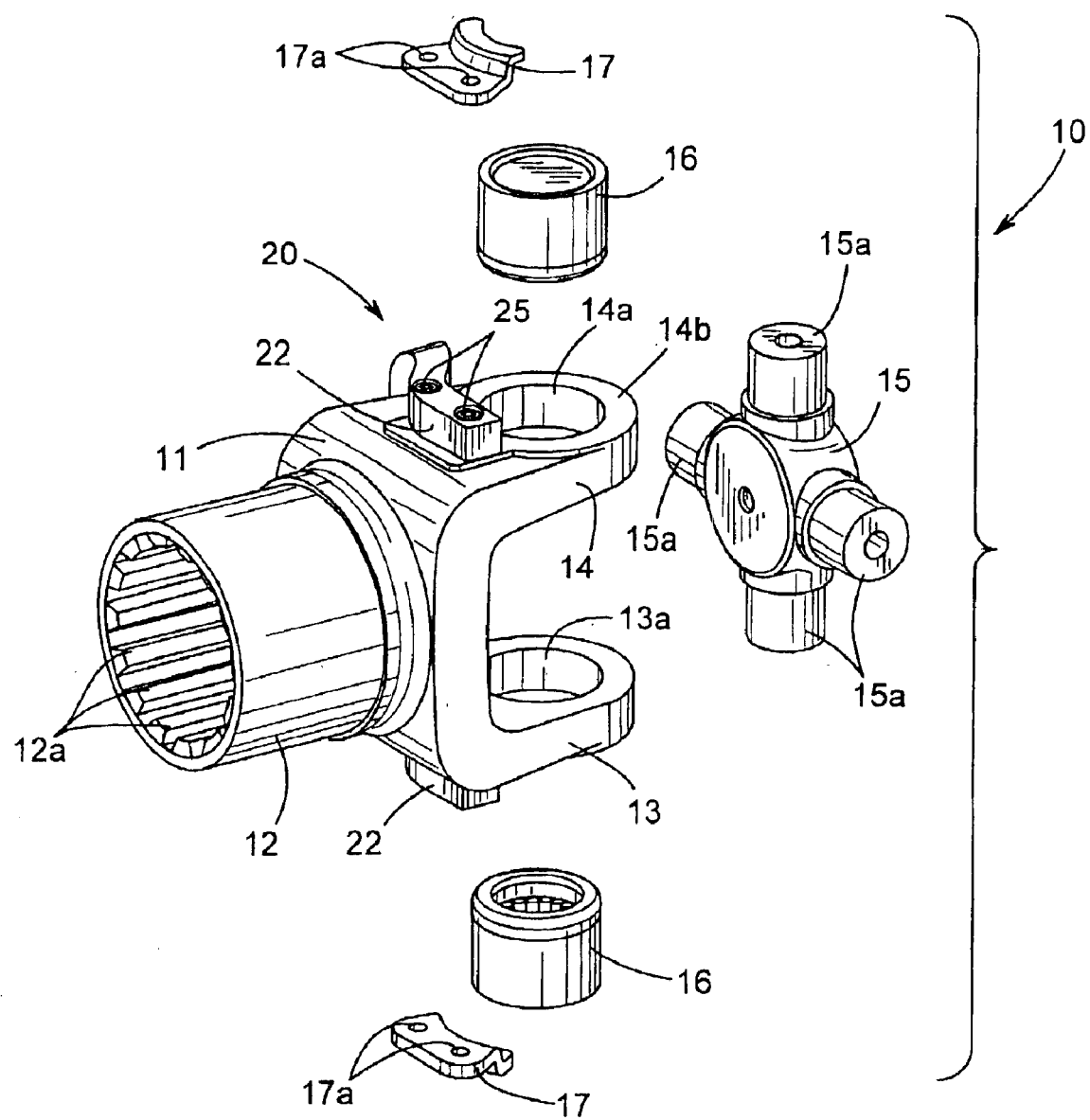
FIG. 3 is an exploded perspective view similar to FIG. 1 showing the first embodiment of the assembly tool installed upon the yoke.

The assembly of the components 10 of the illustrated portion of the universal joint using the first embodiment of the assembly tool 20 of this invention will now be described. Initially, the first embodiment of the assembly tool 20 is mounted or otherwise supported on or relative to the yoke 11, such as shown in FIG. 3. To accomplish this, the first embodiment of the assembly tool 20 can be moved toward the yoke 11 such that the inner surfaces 22a of the end portions 22 abut the machined outer surfaces 13b and 14b of the arms 13 and 14 of the yoke 11. However, the first embodiment of the assembly tool 20 can be adapted to engage, directly or indirectly, and be supported on or relative to any other portion of the yoke 11. Preferably, the apertures 22b formed through the end portions 22 of the first embodiment of the assembly tool 20 are aligned with the threaded bores 14c formed in the arms 13 and 14 of the yoke 11. If desired, the first embodiment of the assembly tool 20 can be positively secured to the yoke 11 by a pair of threaded fasteners 25 (see FIG. 3) that extend through the apertures 22b formed through the end portions 22 of the first embodiment of the assembly tool 20 into engagement with the threaded bores 14c formed in the arms 13 and 14 of the yoke 11.

As discussed above, the semi-cylindrical recesses 21a and 23a are formed in the central body portion 21 and the extension member 23 of the first embodiment of the assembly tool 20. The recesses 21a and 23a are preferably located precisely at the midpoint between the inner surfaces 22a of the end portions 22 of the first embodiment of the assembly tool 20. Because the inner surfaces 22a of the first embodiment of the assembly tool 20 abut the machined outer surfaces 13b and 14b of the arms 13 and 14 of the yoke 11, and further because the machined outer surfaces 13b and 14b of the arms 13 and 14 of the yoke 11 are precisely positioned relative to the rotational center axis of the yoke 11, the semi-cylindrical recesses 21a and 23a formed in the central body portion 21 and the extension member 23 of the first embodiment of the assembly tool 20 are precisely positioned relative to the rotational center axis of the yoke 11 when the first embodiment of the assembly tool 20 is mounted on the yoke 11.

Figure 4:
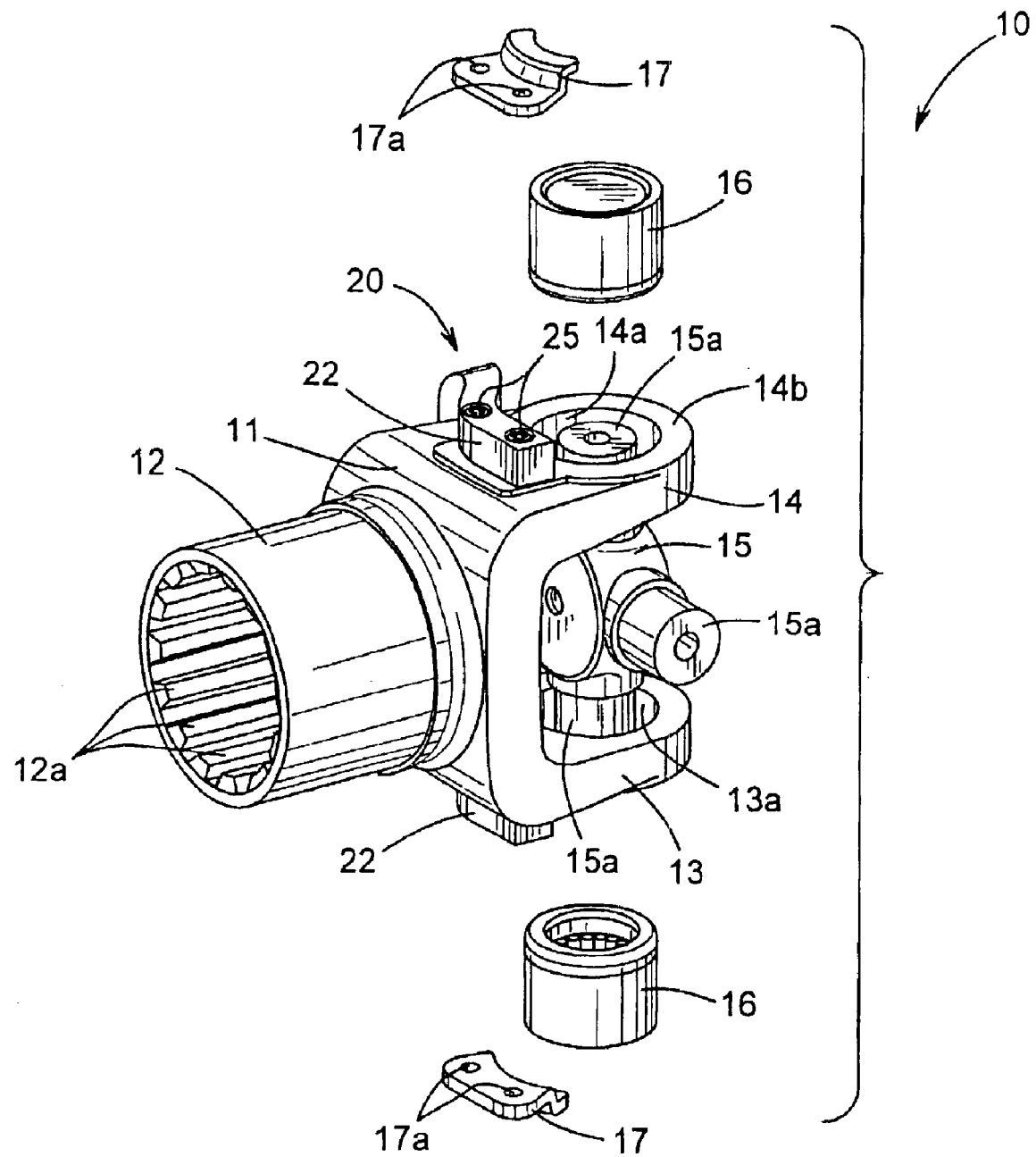
FIG. 4 is an exploded perspective view similar to FIG. 3 showing the cross installed upon the first embodiment of the assembly tool within the yoke.
Figure 5:
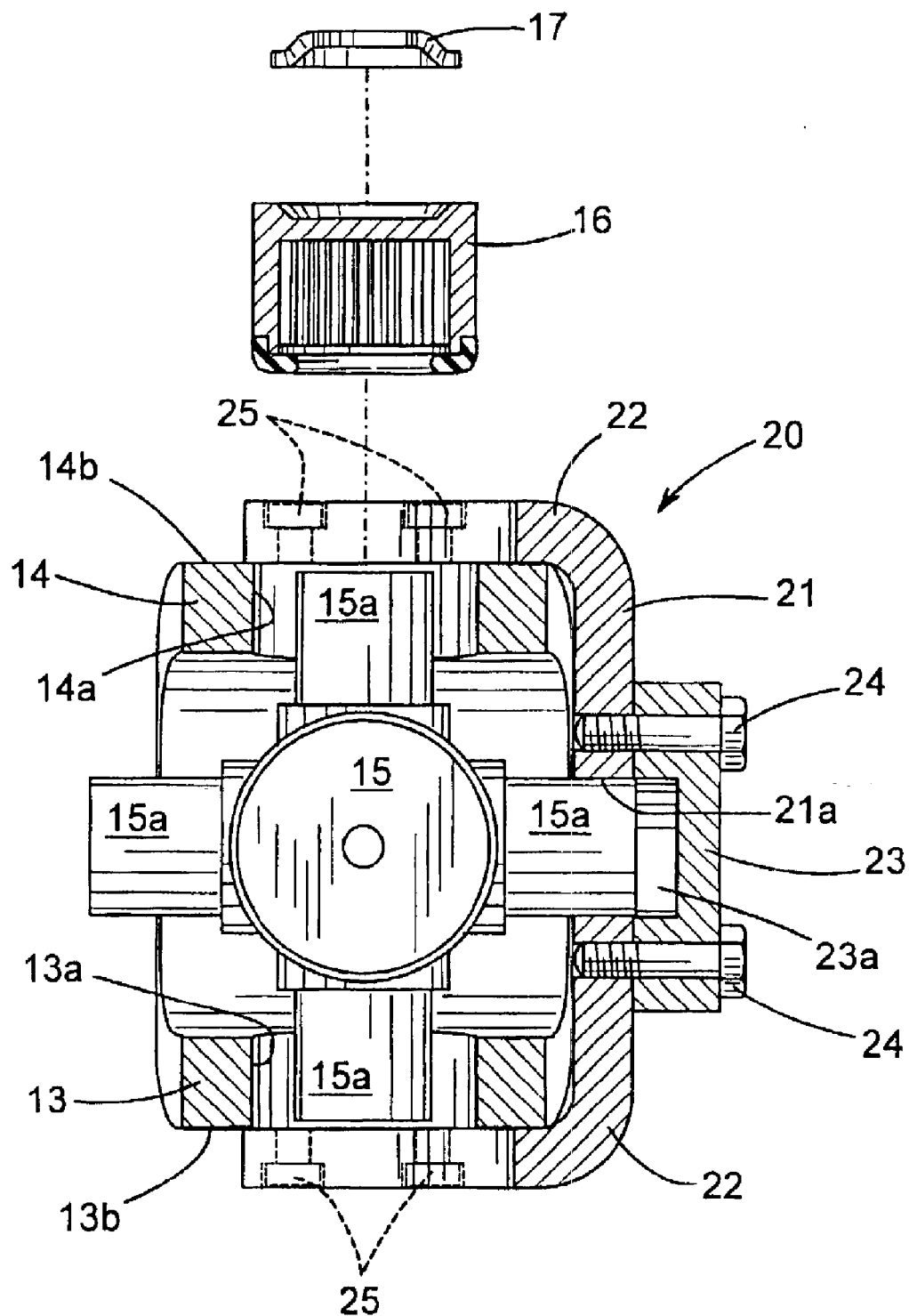
FIG. 5 is an end elevational view, partially in cross section, of the components of the universal joint and the first embodiment of the assembly tool illustrated in FIG. 4.

Next, the cross 15 is moved within the yoke 11 such that two of the opposed trunnions 15a on the cross 15 are received within the aligned openings 13a and 14a formed through the arms 13 and 14 of the yoke, as shown in FIGS. 4 and 5. At the same time, one of the other trunnions 15a of the cross 15 is received within the recesses 21a and 23a formed in the central body portion 21 and the extension member 23 of the first embodiment of the assembly tool 20. The recess 21a is preferably sized to snugly receive the trunnion 15a therein with little play. The recess 23a can be sized in a similar manner or can be somewhat larger in size to facilitate the insertion of the trunnion 15a within the recess 21a. Regardless, the disposition of the trunnion 15a within the recesses 21a and 23a causes the rotational center axis of the cross 15 to be precisely positioned relative to the rotational center axis of the yoke 11. Such precise positioning is important to prevent or minimize the occurrence of undesirable noise and vibration when the universal joint is operated, as discussed above.

Figure 6:
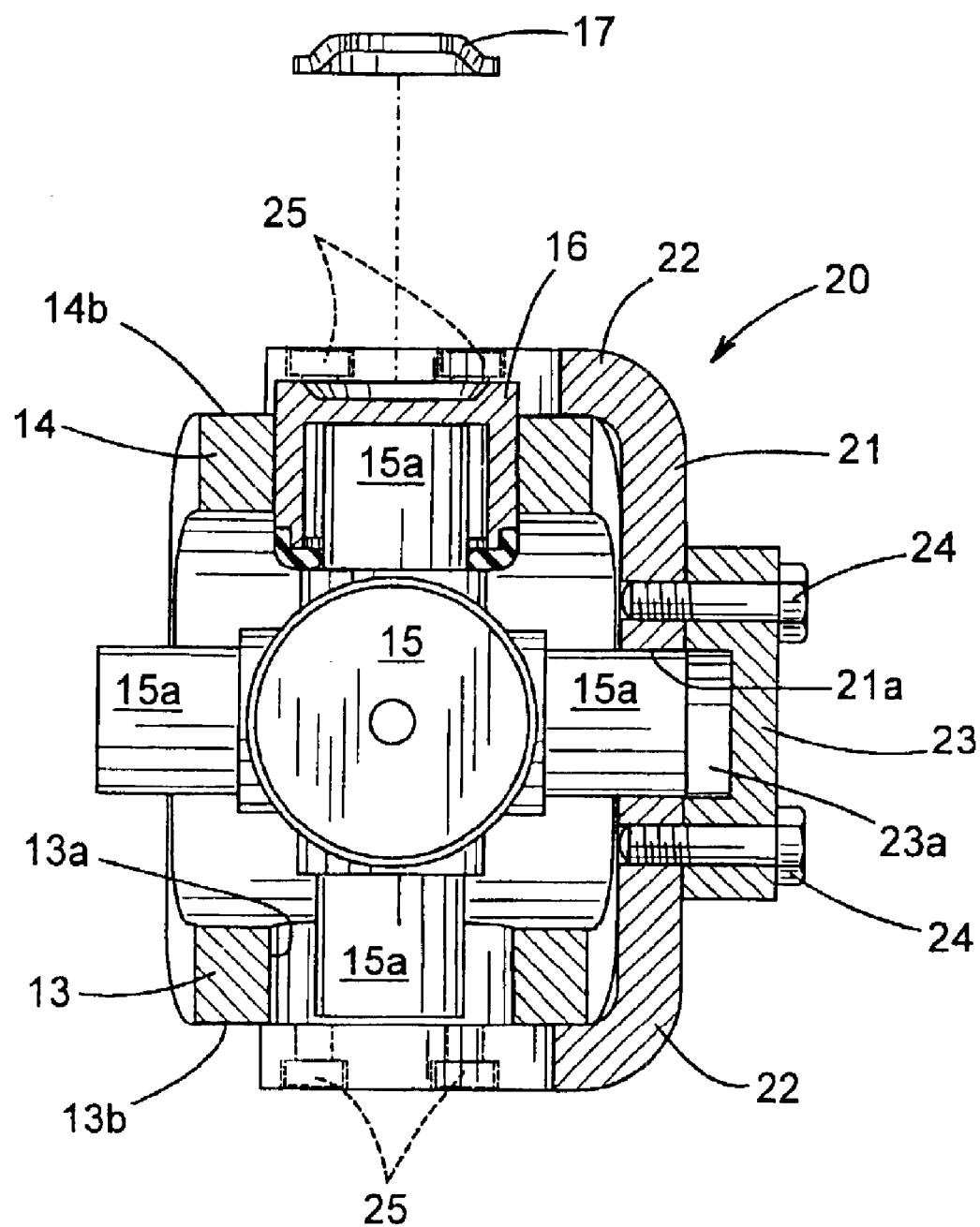
FIG. 6 is an end elevational view similar to FIG. 5 showing the bearing cup installed upon the cross.

Then, one or both of the bearing cups 16 can be installed through the openings 13a and 14a formed through the arms 13 and 14 of the yoke 11 and onto the opposed trunnions 15a, such as shown in FIG. 6. Such bearing cups 16 can be installed using any conventional mechanical press, hydraulic press, or similar device. As the bearing cups 16 are being installed, the first embodiment of the assembly tool 20 functions to support the cross 15 during the installment of the bearing cup 16 and to maintain the rotational center axis of the cross 15 precisely positioned relative to the rotational center axis of the yoke 11. Once one or both the bearing cups 16 are installed as shown in FIG. 6, the frictional engagement of the bearing cups 16 with the arms 13 and 14 of the yoke 11 will maintain the rotational center axis of the cross 15 precisely positioned relative to the rotational center axis of the yoke 11. Thus, the first embodiment of the assembly tool 20 can be removed. Lastly, the retainer clips 17 can be secured in a conventional manner to the machined outer surfaces 13b and 14b using the same threaded fasteners 25 used to secure the first embodiment of the assembly tool 20 to the yoke 11.

Figure 7:
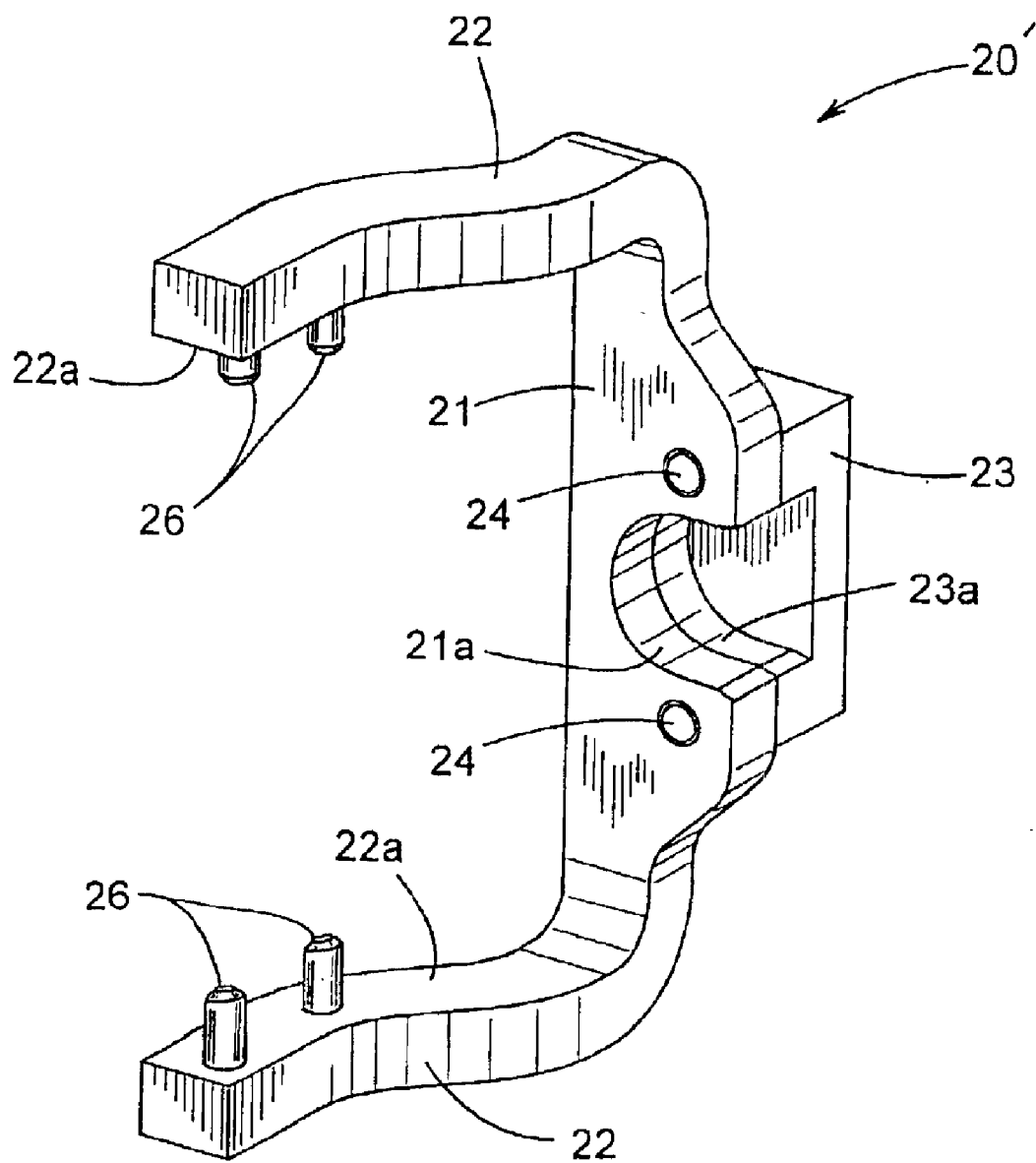
FIG. 7 is an enlarged perspective view of a second embodiment of the assembly tool illustrated in FIGS. 1 through 6.

FIG. 7 illustrates a second embodiment of a tool, indicated generally at 20', for facilitating the assembly of the components 10 of the illustrated portion of the universal joint. The second embodiment of the assembly tool 20' is similar to the first embodiment of the assembly tool 20 described above, and like reference numbers are used to designate similar structures. The end portions 22 of the second embodiment of the assembly tool 20' do not have the apertures 22b formed therethrough, as discussed above. Rather, each of the end portions 22 of the second embodiment of the assembly tool 20' has a pair of spring loaded pins 26 provided thereon. The spring loaded pins 26 are, of themselves, conventional in the art and are movable between the extended positions illustrated in FIG. 7, wherein the pins 26 are extended inwardly from the respective end portions 22 toward one another, and retracted positions, wherein the pins 26 are retracted within such respective end portions 22.

The second embodiment of the assembly tool 20' is mounted or otherwise supported on or relative to the yoke 11 by moving it toward the yoke 11 such that the inner surfaces 22a of the end portions 22 abut the machined outer surfaces 13b and 14b of the arms 13 and 14 of the yoke 11, as described above. To accomplish this, the spring loaded pins 26 must be moved from their extended positions illustrated in FIG. 7 outwardly apart from one another to their retracted positions within the arms 22. This can be effected in any desired manner, such as by manually pushing the spring loaded pins 26, using a separate retraction tool to move the spring loaded pins, and the like. Alternatively, the ends of the spring loaded pins 26 may be chamfered as shown in FIG. 7 such that lateral engagement thereof by the arms 13 and 14 of the yoke 11 cause such pins 26 to be moved to their retracted positions. In any event, the second embodiment of the assembly tool 20' is then positioned relative to the yoke such that the spring loaded pins 26 carried on the arms 22 are aligned with the threaded bores 14c formed in the arms 13 and 14 of the yoke 11. When this occurs, the spring loaded pins 26 moved inwardly within such threaded bores 14c to positively position the second embodiment of the assembly tool 20' relative to the yoke 11. The second embodiment of the assembly tool 20' can be used in substantially the same manner as described above to facilitate the installation of the cross 15 on the yoke 11.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method for assembling a portion of a universal joint comprising the steps of:
   (a) providing a yoke including a body portion and first and second arms, the first and second arms having respective first and second openings formed therethrough;
   (b) providing a cross including a body portion having first and second trunnions extending outwardly therefrom;
   (c) providing an assembly tool;
   (d) supporting the assembly tool on the yoke by providing a threaded bore in the yoke, providing an aperture through the assembly tool, and threading a threaded fastener through the aperture into threaded engagement with the threaded bore;
   (e) supporting the cross on the assembly tool such that the cross is positioned relative to the yoke and such that the first and second trunnions extend respectively within the first and second openings; and
   (f) installing first and second bearing cups respectively within the first and second openings and respectively about the first and second trunnions.

2. The method defined in claim 1 wherein said step (a) is performed by providing a yoke having a surface that is located relative to a rotational center axis of the yoke, and wherein said step (d) is performed by supporting the assembly tool on the surface of the yoke.

3. The method defined in claim 1 wherein said step (a) is performed by providing a yoke having a pair of opposed surfaces that are located relative to a rotational center axis of the yoke, and wherein said step (d) is performed by supporting the assembly tool on the opposed surfaces of the yoke.

4. The method defined in claim 1 wherein said step (d) is performed by securing the assembly tool to the yoke.

5. The method defined in claim 1 wherein said step (b) is performed by providing a cross including a third trunnion extending outwardly therefrom, said step (c) is performed by providing a recess on the assembly tool, and said step (e) is performed by inserting the third trunnion within the recess such that the cross is positioned relative to the yoke.

6. The method defined in claim 1 wherein said step (c) is performed by providing an assembly tool that is generally U-shaped, having a central body portion and a pair of end portions extending therefrom.

7. The method defined in claim 6 wherein said step (a) is performed by providing a yoke having a pair of opposed surfaces that are located relative to a rotational center axis of the yoke, and wherein said step (d) is performed by supporting the end portions of the assembly tool on the opposed surfaces of the yoke.

8. The method defined in claim 6 wherein said step (b) is performed by providing a cross including a third trunnion extending outwardly therefrom, said step (c) is performed by providing a recess on the central body portion of the assembly tool, and said step (e) is performed by inserting the third trunnion within the recess such that the cross is positioned relative to the yoke.

9. A method for assembling a portion of a universal joint comprising the steps of:
  (a) providing a yoke including a body portion and first and second arms, the first and second arms having respective aligned first and second openings formed therethrough;
  (b) providing a cross including a body portion having first, second, and third trunnions extending outwardly therefrom;
  (c) providing an assembly tool having a recess formed therein;
  (d) supporting the assembly tool on the yoke;
  (e) supporting the third trunnion of the cross on the assembly tool such that the cross is positioned relative to the yoke and such that the first and second trunnions extend respectively within the first and second openings; and
  (f) installing first and second bearing cups respectively within the first and second openings and respectively about the first and second trunnions.

10. The method defined in claim 9 wherein said step (a) is performed by providing a yoke having a pair of opposed surfaces that are located relative to a rotational center axis of the yoke, and wherein said step (d) is performed by supporting the end portions of the assembly tool on the opposed surfaces of the yoke.

11. The method defined in claim 9 wherein said step (d) is performed by securing the assembly tool to the yoke.

12. The method defined in claim 11 wherein said step (d) is performed by providing a threaded bore in the yoke, providing an aperture through an end portion of the assembly tool, and threading a threaded fastener through the aperture into threaded engagement with the threaded bore.

13. The method defined in claim 9 wherein said step (d) is performed by providing a bore in the yoke, providing a pin in the assembly tool, and inserting the pin into the bore.

14. The method defined in claim 9 wherein said step (d) is performed by providing a bore in the yoke, providing a spring loaded pin in the assembly tool, and inserting the pin into the bore.

15. A method for assembling a portion of a universal joint comprising the steps of:
  (a) providing a yoke including a body portion and first and second arms, the first and second arms having respective first and second openings formed therethrough;
  (b) providing a cross including a body portion having first and second trunnions extending outwardly therefrom;
  (c) providing an assembly tool;
  (d) supporting the assembly tool on the yoke;
  (e) supporting the cross on the assembly tool such that the cross is positioned relative to the yoke and such that the first and second trunnions extend respectively within the first and second openings; and
  (f) while the cross is supported on the assembly tool, installing first and second bearing cups respectively within the first and second openings and respectively about the first and second trunnions.

16. The method defined in claim 15 wherein said step (a) is performed by providing a yoke having a surface that is located relative to a rotational center axis of the yoke, and wherein said step (d) is performed by supporting the assembly tool on the surface of the yoke.

17. The method defined in claim 15 wherein said step (a) is performed by providing a yoke having a pair of opposed surfaces that are located relative to a rotational center axis of the yoke, and wherein said step (d) is performed by supporting the assembly tool on the opposed surfaces of the yoke.

18. The method defined in claim 15 wherein said step (d) is performed by providing a threaded bore in the yoke, providing an aperture through an end portion of the assembly tool, and threading a threaded fastener through the aperture into threaded engagement with the threaded bore.

19. The method defined in claim 15 wherein said step (d) is performed by providing a bore in the yoke, providing a pin in the assembly tool, and inserting the pin into the bore.

20. The method defined in claim 15 wherein said step (d) is performed by providing a bore in the yoke, providing a spring loaded pin in the assembly tool, and inserting the pin into the bore.

21. A method for assembling a portion of a universal joint comprising the steps of:
  (a) providing a yoke including a body portion and first and second arms, the first and second arms having respective first and second openings formed therethrough;
  (b) providing a cross including a body portion having first and second trunnions extending outwardly therefrom;
  (c) providing an assembly tool;
  (d) supporting the assembly tool on the yoke by providing a bore in the yoke, providing a spring loaded pin in the assembly tool, and inserting the pin into the bore;
  (e) supporting the cross on the assembly tool such that the cross is positioned relative to the yoke and such that the first and second trunnions extend respectively within the first and second openings; and
  (f) installing first and second bearing cups respectively within the first and second openings and respectively about the first and second trunnions.

* * * * *